T. R. & G. Bailey,
Tenoning Machine.
N° 11,349.      Patented July 25, 1854.

UNITED STATES PATENT OFFICE.

THOS. R. BAILEY AND GEO. BAILEY, OF LOCKPORT, NEW YORK.

DEVICE IN MACHINE FOR CUTTING ROUND TENONS.

Specification of Letters Patent No. 11,349, dated July 25, 1854.

*To all whom it may concern:*

Be it known that we, THOMAS R. BAILEY and GEORGE BAILEY, of Lockport, in the county of Niagara and State of New York, have invented a new and useful Improvement in Machines for Cutting Tenons on Bedstead-Rails; and we do hereby declare that the following is a full, clear, and exact description of the same, reference being had to the annexed drawings, making a part of this specification, in which—

Figure 1:
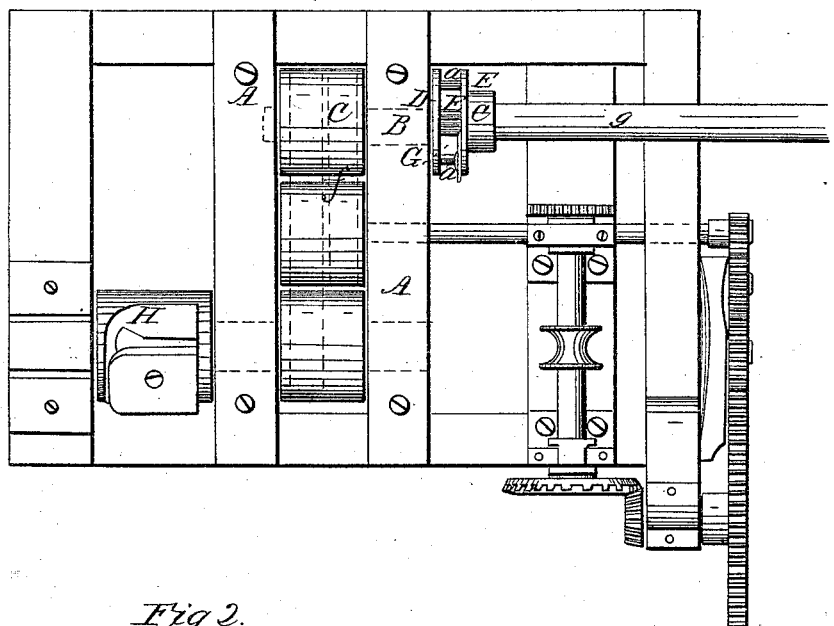
Figure 2:
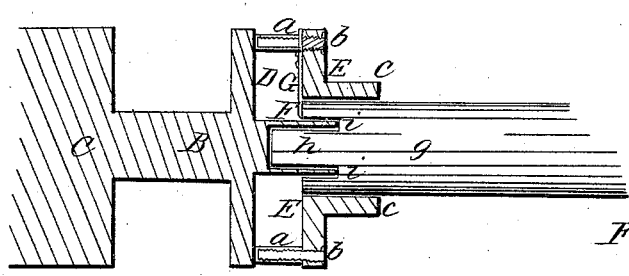
Figure 3:
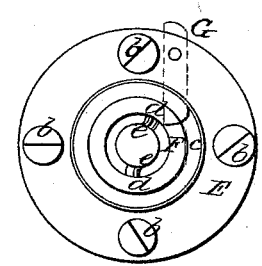
Figure 4:
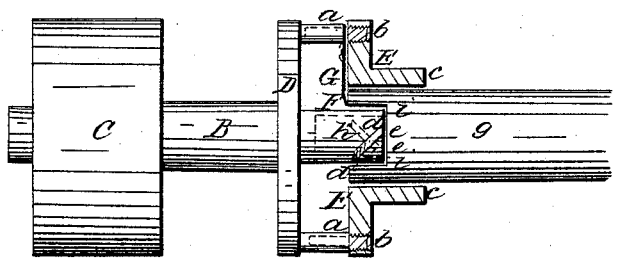

Figure 1, is a plan or top view of the machine. Fig. 2, is a section of the tenon cutter and chuck, the line of section being through the center. Fig. 3, is a front view of the cutter and chuck. Fig. 4, is an external view of the cutter, the outer plate of the chuck being bisected through the center.

Similar letters of reference indicate corresponding parts in the several figures.

The nature of my invention consists in a cutter and chuck constructed and arranged as will be hereafter shown, for the purpose of cutting tenons on the ends of bedstead rails.

To enable others skilled in the art to make and use our invention, we will proceed to describe its construction and operation.

A, represents a suitable frame work, in which an arbor, B, works, said arbor having a driving pulley, C, upon it, and also a circular plate, D. The plate, D, has four studs, (*a*), (*a*), (*a*), (*a*), of a suitable length, projecting at right angles from its face, as shown in Figs. 1, 2, and 4; and to the outer ends of the studs, a plate E, is secured by screws, (*b*), see Figs. 2, 3, and 4.

The two plates, D, E, are concentric with each other, and the outer plate, E, has a circular aperture at its center, surrounded by a rim, (*c*), which projects a short distance from the plate. The two plates form a chuck or guide for the bedstead rail while being tenoned.

F, Figs. 2, 3, and 4, is the tenon cutter, which is of tubular form. The barrel or tube of the cutter, F, may be considered as a prolongation of the arbor, B, and the bore of the barrel or tube extends inward nearly to the inner plate, D, see Fig. 2, and dotted lines in Fig. 4. The length or depth of the bore, of course, corresponds to the length of the tenon. On the ends of the tube or barrel, the cutter is formed by making two oblique slots, (*d*), (*d*), in the barrel or tube at opposite points. The oblique position of the slots being reverse to each other, as shown in Fig. 4. The slots leave two cutting edges in the end of the tube or barrel, one to each slot, as shown at (*e*), (*e*), Figs. 3 and 4.

G, is a cutter attached to the inner side or surface of the outer plate, E, and tangentially with the tube or barrel of the tenon cutter, F. The edge of this cutter just touches the periphery of the tube or barrel of the tenon cutter, F, as shown clearly in Fig. 3.

The bedstead rails on which the tenons are cut, are cylindrical, and may be cut or turned by means of a cutter, H, see Fig. 1, attached to the same frame work, A, as the chuck and cutter.

Operation.—Motion is communicated to the cutter, F, and the plates, D, E, or chuck, by means of a belt, (*f*) passing around the pulley, C, see dotted lines, Fig. 1. The end of the rail is then shoved in the aperture at the center of the outer plate, E, see Figs. 1, 2, and 4, (*g*), indicating the rail. The cutter, F, cuts around tenon, (*h*), see Fig. 2, which enters the bore of the tube or barrel of the cutter, and the cutter, G, cuts off the wood on the outer side of the tenon, about half way between the outer and lower ends of the tenon, leaving a recess or groove, (*i*), in the end of the rail, as shown clearly in Fig. 2. The rim, (*c*), serves as a guide to the rail, and causes the tenon to be cut precisely at the center of the end of the rail.

We do not claim the cutter G, for that is in use in various machines, for similar purposes; neither do we claim the cutter, F, separately, but What we do claim as our invention and desire to secure by Letters Patent, is—

The arrangement of the tube *c*, exterior to, and concentric with the cutting tube F, so that the rail may be steadied during the operation of the machine, and the tenon so cut that its axis shall be coincident with the axis of the rail.

THOMAS R. BAILEY.
GEORGE BAILEY.

Witnesses:
E. A. WAKEMAN.
A. CLARK.